H. F. SCHMIDT.
THRUST BEARING AND DYNAMOMETER.
APPLICATION FILED JUNE 13, 1918.

1,298,630.

Patented Mar. 25, 1919.

INVENTOR.
Henry F. Schmidt
BY
HIS ATTORNEY IN FACT

UNITED STATES PATENT OFFICE.

HENRY F. SCHMIDT, OF PITTSBURGH, PENNSYLVANIA, ASSIGNOR TO WESTINGHOUSE GEAR & DYNAMOMETER COMPANY, A CORPORATION OF PENNSYLVANIA.

THRUST-BEARING AND DYNAMOMETER.

1,298,630.      Specification of Letters Patent.      Patented Mar. 25, 1919.

Application filed June 13, 1918. Serial No. 239,811.

*To all whom it may concern:*

Be it known that I, HENRY F. SCHMIDT, a citizen of the United States, and a resident of Pittsburgh, in the county of Allegheny and State of Pennsylvania, have made a new and useful Invention in a Thrust-Bearing and Dynamometer, of which the following is a specification.

This invention relates to thrust bearings and has for an object to produce a new and improved thrust bearing in which the thrust is transmitted by means of a liquid and in which the pressure of the liquid is a measure of the power transmitted by the apparatus imparting thrust to the thrust bearing.

A further object is to produce a new and improved thrust bearing in which a liquid under pressure is employed for counterbalancing the thrust and in which the pressure of the liquid is automatically varied with the thrust load.

A further object is to produce a new and improved thrust bearing in which means are employed for reducing frictional losses and wear to a minimum.

These and other objects are attained by means of a thrust bearing embodying the features herein described and illustrated in the drawing accompanying and forming a part hereof.

My invention contemplates a thrust bearing in which the thrust is transmitted from a rotatable piston to a stationary cylinder by means of liquid under pressure. The bearing is preferably so arranged that the piston is held away from the ends of the cylinder by the fluid pressure so that the danger of metal to metal contact is eliminated. Friction is thereby reduced to a minimum and consists merely of the liquid friction within the space between the piston and the ends of the cylinder. I preferably control the admission of fluid to the cylinder in accordance with variations in the load imposed on the bearing. The mechanism for accomplishing this may also embody a dynamometer feature for indicating the power transmitted by the apparatus to which the thrust bearing is connected.

Figure 1:
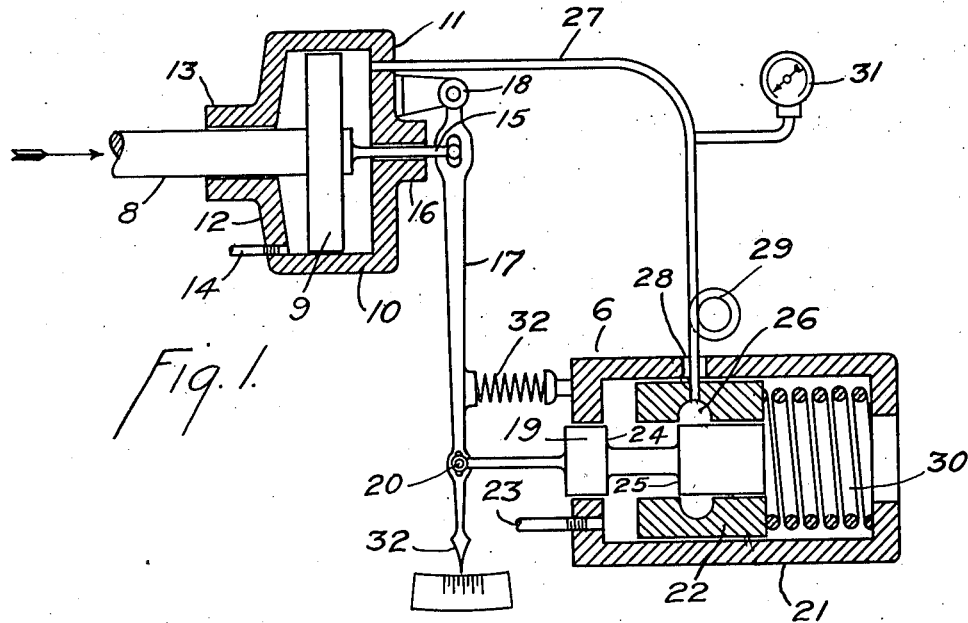
Figure 1 is a diagrammatic sectional view of a thrust bearing embodying my invention.

In Fig. 1 of the drawings, I have shown a thrust bearing as applied to the end of the horizontal shaft 8. As shown a piston 9 is formed or mounted on the end of the shaft 8 and is inclosed within a stationary thrust resisting cylinder 10. The cylinder 10 is provided with cylinder heads 11 and 12, the head 12 being provided with a boss 13 through which the shaft 8 projects. The thrust bearing is illustrated as adapted to counterbalance thrust in the direction indicated by the arrow. A constant flow of fluid hereinafter called oil, is delivered to the cylinder 10 between the piston 9 and the cylinder head 11 and is maintained at a pressure sufficient to counterbalance the thrust load. The excess oil leaks past the piston 9 and is drained from the other end of the cylinder by means of a drain pipe 14.

The delivery of oil to the cylinder 10 is controlled by means of a valve mechanism 6 which in turn is controlled by axial movements of the piston 9. As shown, a small plunger 15 extends through a boss 16 on the cylinder head 11 and is pivotally connected to a multiplying lever 17, which controls the operation of the valve mechanism 6. The inner end of the plunger 15 rests against the piston 9 and is held in contact therewith by the force of a spring 32 acting on the lever 18. As shown, the lever 17 is fulcrumed on a stationary pivot pin 18 located above and relatively close to the plunger 15. A valve 19 in the valve mechanism 6 is connected to the other end of the lever 17 by a pin 20 located a relatively great distance from the plunger 15. Consequently any movement of the plunger 15 will be greatly magnified in being duplicated by the valve 19.

As shown, the valve mechanism 6 includes a cylindrical chamber 21 in which a movable annular valve seat 22 is provided for the valve 19. Oil under pressure is delivered to one end of the casing 21 by means of a conduit 23. The valve 21 is provided with two shoulders 24 and 25, both exposed to the pressure of the oil so that the valve is balanced against internal oil pressure. Midway between the ends of the valve seat 22, I have shown an annular groove 26 which coöperates with the shoulder 25 on the valve 19 in controlling the delivery of oil to the cylinder 10 of the thrust bearing. As shown, the annular groove 26 is connected with the cylinder 10 by means of a flexible conduit 27, which extends through a slot 28 in the valve casing 21 and is provided with a loop 29 to increase its flexibility.

Oil under pressure delivered to the casing 21 tends to move the valve seat 22 so as to shut off the delivery of oil to the cylinder 10. This movement is opposed by a heavy spring 30 located behind the valve seat.

If the oil pressure at the source of supply increases, the valve seat 22 is moved so as to reduce the valve opening and to thereby prevent the piston 9 from being affected by the change of pressure. If the pressure at the source decreases, the spring 30 moves the valve seat 22 so as to increase the valve opening and to thereby compensate for the pressure drop. Within reasonable limits the piston is independent of fluctuations of the pressure of the oil and is therefore controlled solely by the valve 19, which of course is controlled by the piston itself so as to limit the movement of the piston to a narrow zone.

In the thrust bearing illustrated, the thrust may be measured either by means of a pressure gage 31 connected, as shown, to the pipe 27, or by means of a pointer 32 attached to or forming a part of the multiple lever 17.

Figure 2:
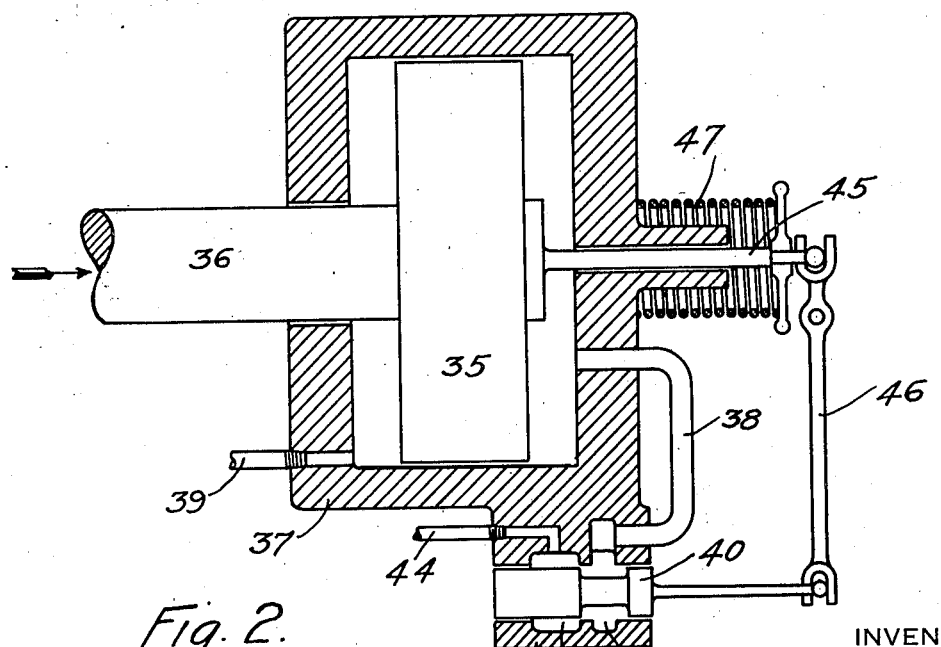
Fig. 2 is a similar view of a modification of the thrust bearing illustrated in Fig. 1.

The thrust bearing illustrated in Fig. 2 is a modification of the thrust bearing illustrated in Fig. 1. As shown, a piston 35 is formed or mounted on the end of a shaft 36 and is inclosed within a cylinder 37. Oil under pressure is admitted to one end of the cylinder 37 by means of a conduit 38 and is drained from the other end by a conduit 39. The delivery of oil to the cylinder is controlled by means of a valve 40, which is balanced against oil pressure and operates in a valve casing 41 forming a part of or attached to the wall of the cylinder 37. Within the casing 41 and surrounding the valve 11, I have shown two annular chambers 42 and 43. Oil under pressure is delivered to the chamber 42 by means of a conduit 44. The chamber 43 is connected with the cylinder 37 by means of the conduit 38, above referred to, and the flow of oil from the chamber 42 to the chamber 43 and hence to the cylinder 37 is controlled by the valve 40.

As shown, the valve 40 is controlled by the piston 35 through the medium of a small plunger 45 and a multiple lever 46 in the same manner as described in connection with the thrust bearing illustrated in Fig. 1. A tension spring 47 is shown for holding the plunger 45 against the piston 35.

In operation, the piston 35 is moved by variations in the thrust load and in turn moves the valve 40 so as to increase or decrease the flow of oil to the cylinder 37 and to thereby increase or decrease counterbalancing pressure in accordance with variations in the thrust imparted by the shaft 36.

While I have described and illustrated but two embodiments of my invention, it will be apparent to those skilled in the art that various changes, modifications, additions and omissions will be made in the apparatus described and illustrated without departing from the spirit and scope of the invention as set forth by the appended claims.

What I claim is:

1. In a thrust bearing, relatively rotatable members, means for delivering fluid under pressure to the space between said members, and means responsive to axial movements of one of the members for controlling the delivery of said fluid.

2. In a thrust bearing, relatively rotatable thrust members, means for delivering fluid under pressure to the space between said members, and means responsive to axial movements of one of the members for magnifying said movements and for controlling the delivery of the fluid to said thrust members.

3. A thrust bearing comprising a stationary cylinder, a rotatable piston inclosed within the cylinder, and means responsive to axial movements of the piston for controlling the delivery of fluid under pressure to the cylinder and for thereby restricting the axial movement of the piston.

4. A thrust bearing comprising a cylinder, a piston inclosed by the cylinder and movable axially in response to variations in the thrust load, means for admitting fluid under pressure to the cylinder and for controlling the amount of fluid delivered in response to variations in the axial movement of the piston, and means for measuring the thrust imparted by said shaft.

5. In a device of the character described, relatively rotatable members, a source of fluid pressure supply, means for delivering fluid from said source to the space between the members, means responsive to axial movements of one of the members for controlling the delivery of said fluid and fluid pressure responsive means for compensating for variations in pressure of the fluid at the source.

6. In a thrust bearing, relatively rotatable members, means for delivering fluid under pressure to the space between said members, means for controlling the delivery of said fluid, and a multiplying lever actuated by one of the members for magnifying and transmitting axial movements of said member to the controlling means.

In testimony whereof, I have hereunto subscribed my name this 12th day of June, 1918.

HENRY F. SCHMIDT.

Witness:
C. W. McGHEE.